Nov. 15, 1955
F. SANTAMARIA
2,723,475
EDUCATIONAL DEVICE
Filed March 17, 1952
3 Sheets-Sheet 1
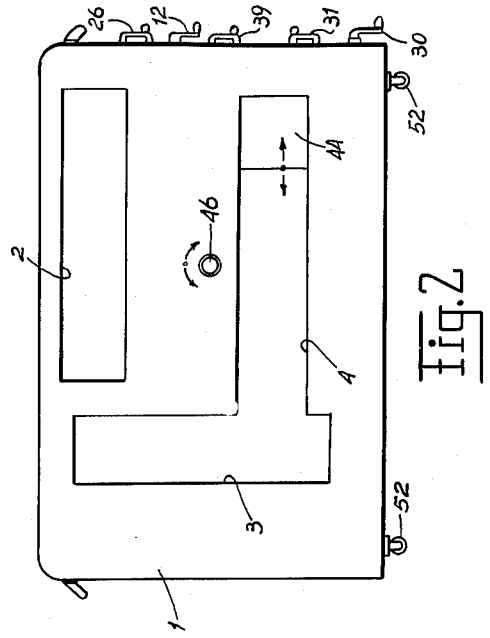
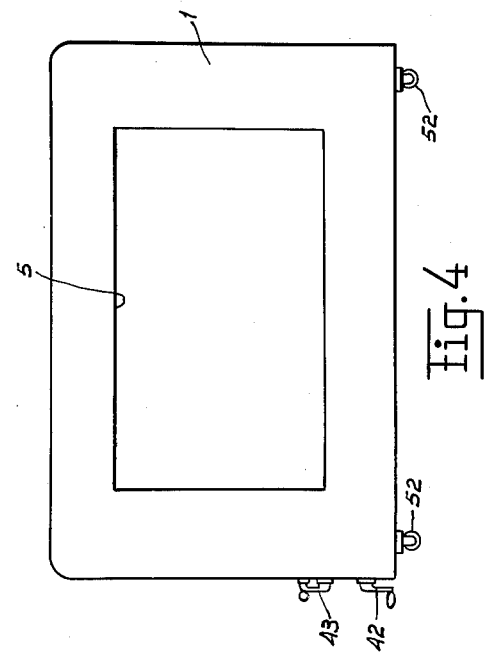
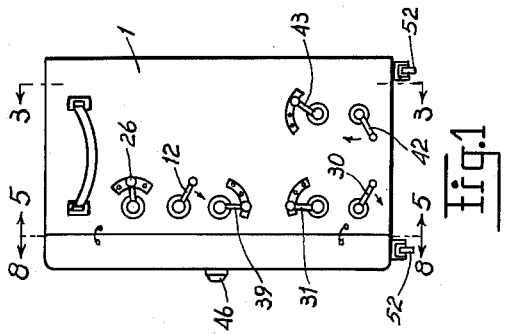
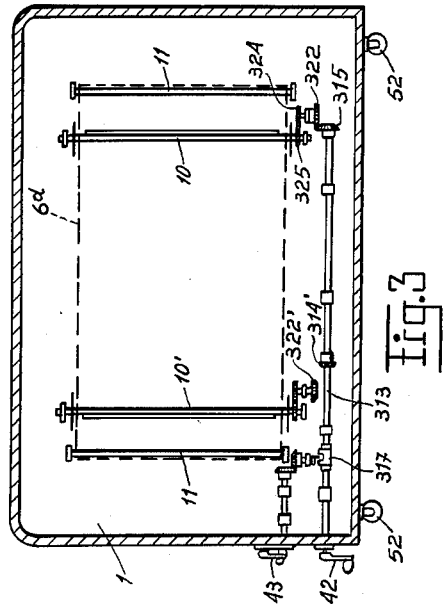
INVENTOR:
FLORENTINO SANTAMARIA
BY
Karl F. Ross
AGENT Nov. 15, 1955  F. SANTAMARIA  2,723,475
EDUCATIONAL DEVICE
Filed March 17, 1952  3 Sheets-Sheet 2
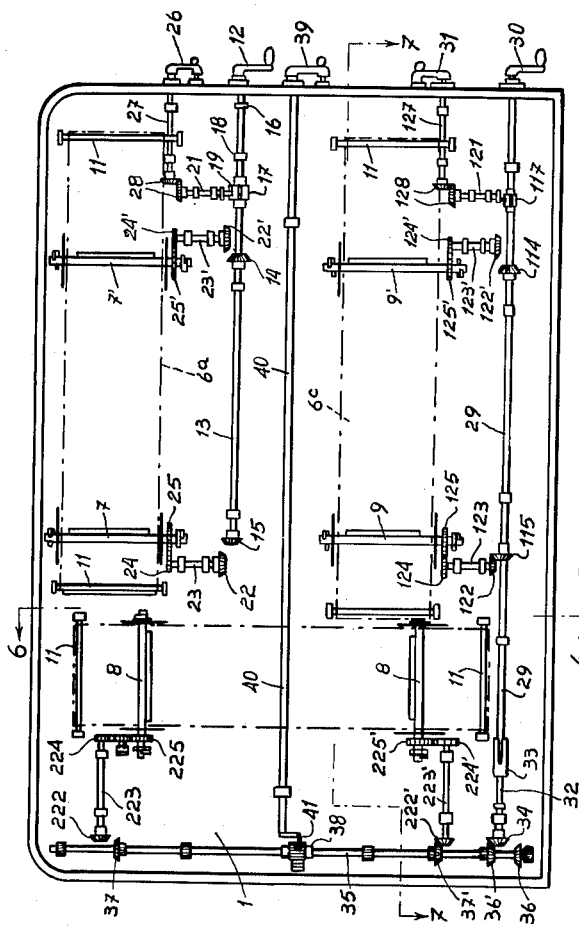
INVENTOR.
FLORENTINO SANTAMARIA
BY
Karl F. Ross
AGENT

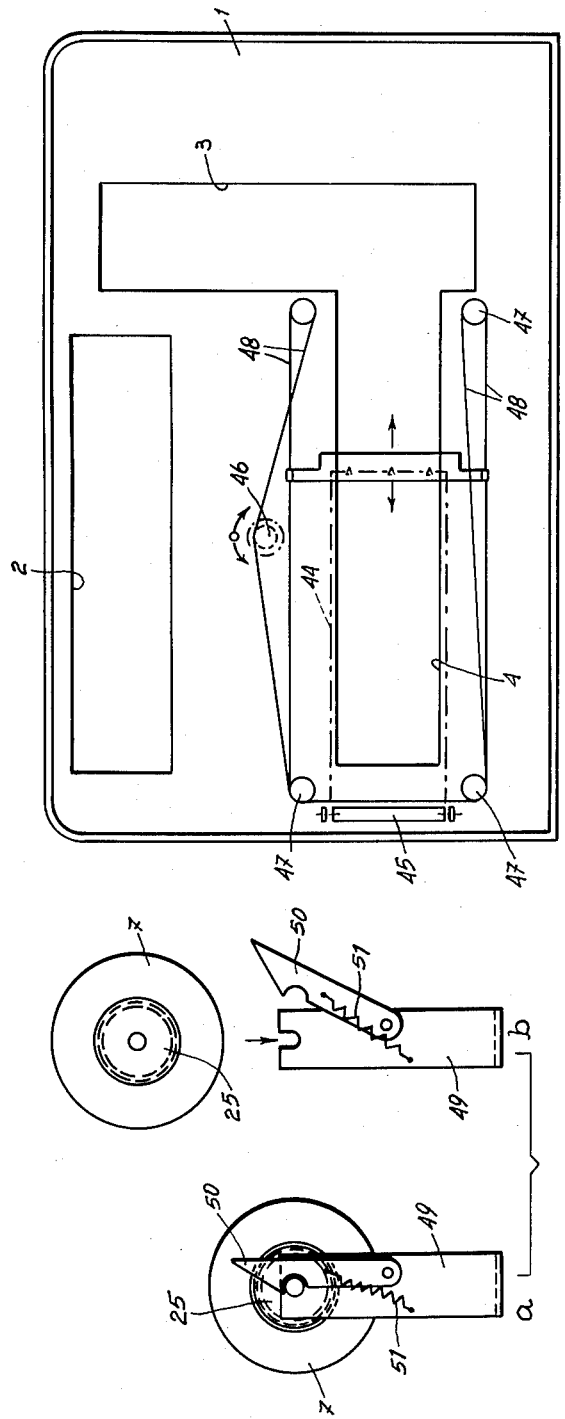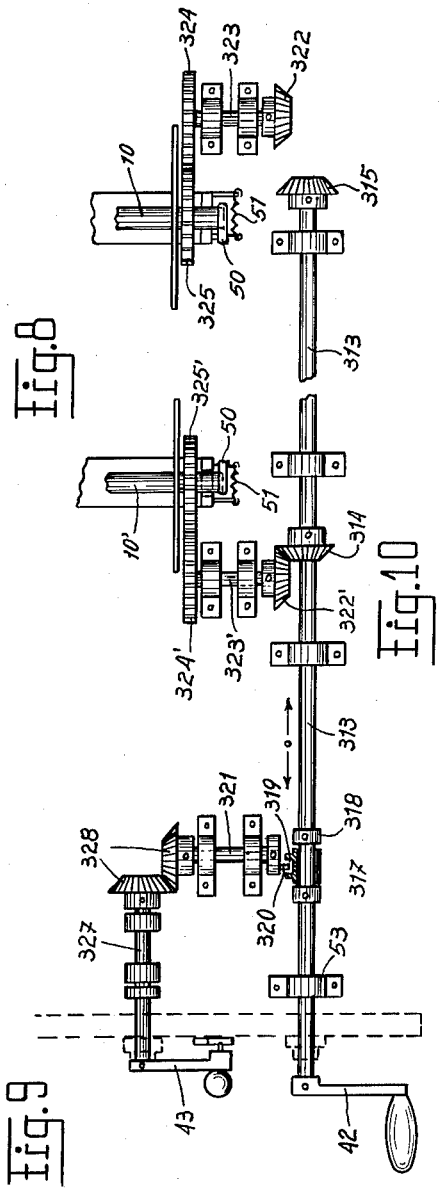

United States Patent Office 2,723,475
Patented Nov. 15, 1955

2,723,475

EDUCATIONAL DEVICE

Florentino Santamaria, Vera Cruz, Brazil

Application March 17, 1952, Serial No. 276,913

1 Claim. (Cl. 40—86)

The present invention relates to a mechanical device adapted for the visual education of children, for advertising purposes, and for the teaching of deaf persons.

An object of the invention is to provide a device of this character which advantageously replaces the conventional blackboard in that it is capable of saving the instructor's time and effort by placing at his disposal a variety of ready-made characters, pictures or symbols that can be made to appear and to disappear in a predetermined order, of attracting and keeping the students' attention by virtue of the continuous or intermittent movement of the characters displayed, and of substituting a lively and colorful display for the dull monotony of the blackboard.

Another object of the invention is to provide a mechanical device for educational purposes which, in addition to having the advantages set forth above, also enables the simultaneous display of a plurality of sets of characters, pictures or the like, preferably as many as three different sets, and to provide means for displacing certain of said sets in unison, if desired, whereby the characters simultaneously displayed may be properly correlated.

A further object of the invention is to provide means in a device as set forth above for selectively reversing the sense of movement, and the order of appearance and disappearance, of the objects displayed.

The above and other objects and features of the invention will become apparent from the following description of a preferred embodiment, reference being had to the accompanying drawing in which:

Fig. 1 is a side elevation of an apparatus according to the invention;

Fig. 2 is a front elevation of the apparatus shown in Fig. 1;

Fig. 3 is a section on the line 3—3 of Fig. 1;

Fig. 4 is a rear elevation of the apparatus;

Fig. 5 is a section on the line 5—5 of Fig. 1;

Fig. 6 is a section on the line 6—6 of Fig. 5;

Fig. 7 is a section on the line 7—7 of Fig. 5;

Fig. 8 is a section on the line 8—8 of Fig. 1;

Fig. 9 is an enlarged view of a detail; and

Fig. 10 is an enlarged view of parts of the control mechanism inside the apparatus.

The apparatus shown in the drawing comprises a box 1 bearing on its front face three elongated windows 2, 3, 4 and on its rear face a single, larger window 5. All the four windows shown are rectangular, the windows 2, 4 and 5 extending in horizontal and the window 3, which merges with the window 4, in vertical direction. Printed strips 6a, 6b, 6c and 6d, wound on reels 7—7', 8—8', 9—9' and 10—10', respectively, pass around idler rollers 11 in such manner that the objects depicted thereon appear in the windows 2, 3, 4 and 5, respectively.

The reels of each pair, such as 7, 7', are alternatively engageable by a common actuating member for selectively moving the associated strip, such as 6a, in one direction or the other by winding it upon the engaged reel and unwinding it from the disengaged one. The actuating mechanism for the reels 7, 7', as best seen in Fig. 5, comprises a crank 12 fixed to a shaft 13 which carries two oppositely oriented bevel gears 14, 15. The shaft 13 is axially movable in bearings such as 53 (Fig. 10) between limits set by the crank 12 and by a collar 16 fixedly secured to the shaft. The means to control such movement comprise a sleeve 17 within which the shaft 13 is freely rotatable, said sleeve being restrained in its axial movement relative to the shaft by two collars 18 secured to the shaft on either side thereof. A transverse peripheral slot 19 in the sleeve 17 is engaged by a pin fixed eccentrically to a shaft 21 which is perpendicular to the shaft 13.

For a more detailed illustration of the control mechanism reference is made to Fig. 10, showing the corresponding mechanism for the reels 10, 10' which is substantially identical with that for the reels 7, 7'. There the shaft 313 carries the sleeve 319, flanked by the collars 318, a pin 320 mounted eccentrically on transverse shaft 321 playing in the groove 319 of the sleeve. Shaft 321 is coupled over a pair of bevel gears 328 with a contral shaft 327 parallel to the main shaft 313. Rotation of the mechanism 327, 329, 321 will cause the pin 320 to shift the shaft 313 either to the left or to the right as viewed in Fig. 10, thereby causing either the reel 10' or the reel 10 to be coupled to shaft 313 over, respectively, bevel gears 314 and 322', shaft 323', gears 324' and 325' or bevel gears 315 and 322, shaft 323, gears 324 and 325.

Returning to Fig. 5, it will be noted that leftward displacement of shaft 13 will cause bevel gear 15 to mesh with a bevel gear 22 on a transverse shaft 23, any rotation of shaft 13 by means of crank 12 being thus imparted to reel 7 via gears 24 and 25; similarly, movement of the shaft 13 to the right will cause its rotation to be communicated to reel 7' by way of bevel gears 14 and 22', shaft 23' and gears 24', 25'. Axial movement of the shaft 13 is controlled from shaft 27, coupled to shaft 21 by way of bevel gears 28, with the aid of a handle 26 which is carried by the shaft 27 and may be indexed in two extreme positions and one intermediate or neutral position, as best seen in Fig. 1; thus movement of the handle 26 to its top position may enable operation of reel 7 while movement to its bottom position may permit reel 7' to be actuated.

A single shaft 29 serves for the selective actuation of a reel of either or both pairs 8—8' and 9—9' upon rotation of a crank 30 secured thereto. The coupling between the shaft 29 and the reels 9, 9' is substantially identical with that described for the shafts 13 and 313 and comprises bevel gears 114, 122' and 115, 122, transverse shafts 123, 123' and gears 124, 125 and 124', 125', axial movement of shaft 29 being controlled by means of a handle 31 over shafts 127, 121, bevel gears 128 and sleeve 117.

A short shaft 32 forms an extension of shaft 29 and is coupled thereto, in any axial position of the latter, by means of a slotted sleeve 33 whose two diametrically opposite longitudinal slots (only one shown) are engaged by respective pins projecting from the shaft 29. Shaft 32 carries a bevel gear 34 adapted to mate with either of two oppositely oriented bevel gears 36, 36' fixed to a vertical shaft 35. The latter shaft carries two oppositely oriented bevel gears 37, 37' adapted to mesh, respectively, with a bevel gear 222 driving reel 8 by way of shaft 223 and gears 224, 225 or with a bevel gear 222' driving reel 8' by way of shaft 223' and gears 224', 225'. Axial movement of the shaft 35, to engage either gear 37 with gear 222 or gear 37' with gear 222', is effected by a horizontal shaft 40 whose eccentric pin 41 enters into a groove in a sleeve 38 which is mounted on shaft 35 in a manner similar to the mounting of sleeve 17 on shaft 13. Shaft 40 is rotated by means of a handle 39 which, like handles 26 and 31, may be indexed in any of three positions.

Crank 42 is similar to cranks 12 and 30 and serves to impart rotation to shaft 313 previously referred to. Handle 43 is mounted on the control shaft 327 and is similar to handles 26, 31 and 39. The cranks are preferably locked, as by a pawl-and-ratchet device of known construction (not shown), against rotation in a direction which would cause unwinding of the strips from the positively engaged reels.

The window 4 is provided with an opaque curtain 44 which is interposed between the window and its strip 6c and may be used for partially or totally obscuring said strip. For this purpose the curtain 44 is mounted on a reel 45 which is provided with an internal spring (not shown), in a manner known per se, to tend to keep the curtain wound around the reel. A rotation knob 46, journaled in the front wall of the box 1, is engaged by a string or wire 48 which pasess around rollers 47 and is fastened to the curtain so that counterclockwise rotation of the knob 46, as viewed in Fig. 8, will cause the curtain to be unwound from the reel whereas clockwise rotation will allow its spring to effect the rewinding thereof. It will be understood that spontaneous rotation of the knob 46 due to the action of the spring will be prevented by friction or other suitable means.

Fig. 9 illustrates in detail the manner in which the reels are removably held in position on stationary supports 49. These supports, as shown, are notched at the top to receive the hubs of the reels (here the reel 7) which are thereupon retained in position by hooks 50 urged into contact therewith by springs 51. Fig. 9(a) shows the reel 7 in its operative position while Fig. 9(b) illustrates the removal thereof from its support.

Casters or wheels 52 may be provided at the underside of the box 41 to enable its ready transportation.

It will be understood that the apparatus according to the invention may be utilized for teaching a variety of subjects including, for example, reading, writing, languages, geography, arithmetic, geometry and so on. Thus, reading may be taught by successively displaying letters and groups of letters in the order in which they apepar in the primer, and any program for individual or collective reading may be readily supervised by the instructor who need not even leave his chair for this purpose. Passages presenting difficulties at a first reading may be recapitulated any number of times; by virtue of the provision of a plurality of windows it is even possible simultaneously to set up different series of problems for different groups of students. Classes having as many as sixty pupils may be served by a single teacher with the aid of the apparatus described.

It may also be mentioned that, notably for advertising purposes, automatic drive and control means may be substituted for the manually operated cranks and handles shown.

Accordingly, while the invention has been described with reference to a single embodiment only it should be understood that the same may be modified in various ways and adapted for diverse purposes without thereby departing from the spirit and scope of the invention as defined in the appended claim.

What is claimed is:

In an educational device, in combination, a box provided with an elongated window, strip mounting means in said box back of said window, actuating means positioned intermediate said window and said strip mount-mounting means to move a printed strip past said window in the longitudinal direction thereof, a curtain positioned intermediate said window and said strip mounting means, control means positioned externally of said box, and operating mechanism connected with said curtain and with said control means for selectively exposing and obscuring all or part of said strip, said mechanism comprising spring-urged wind-up means for said curtain, a set of guide rollers and an endless flexible member wound around said guide rollers and forming two parallel runs moving in the same direction along opposite edges of said window, said curtain being attached to said member along said runs, said control means comprising a rotatable element frictionally engaging said flexible member.

References Cited in the file of this patent

UNITED STATES PATENTS

| | | |
|---|---|---|
| 623,641 | Warrick | Apr. 25, 1899 |
| 739,949 | Towler | Sept. 29, 1903 |
| 921,713 | Johnson | May 18, 1909 |
| 1,458,073 | Padilla | June 5, 1923 |
| 1,847,815 | Church | Mar. 1, 1932 |
| 1,857,673 | Vallen | May 10, 1932 |
| 1,918,298 | Taylor | July 18, 1933 |
| 2,116,163 | Taylor | May 3, 1938 |